United States Patent [19]

Yamada

[11] Patent Number: 4,974,143
[45] Date of Patent: Nov. 27, 1990

[54] INFORMATION PROCESSING APPARATUS WHEREIN ADDRESS PATH IS USED FOR CONTINUOUS DATA TRANSFER

[75] Inventor: Yasuo Yamada, Yokohama, Japan

[73] Assignee: Kabushiki Kaisha Toshiba, Kawasaki, Japan

[21] Appl. No.: 507,085

[22] Filed: Apr. 5, 1990

Related U.S. Application Data

[63] Continuation of Ser. No. 210,994, Jun. 24, 1988, abandoned.

[30] Foreign Application Priority Data

Jun. 26, 1987 [JP] Japan .................... 62-159050

[51] Int. Cl.$^5$ .................. G06F 13/40; G06F 3/00
[52] U.S. Cl. .................. 364/200; 364/240.3; 364/251.2
[58] Field of Search ..... 364/200 MS file, 900 MS file

[56] References Cited

U.S. PATENT DOCUMENTS

| 4,144,562 | 3/1979 | Cooper ..................... 364/200 |
| 4,724,518 | 2/1988 | Steps ....................... 364/200 |
| 4,796,221 | 1/1989 | Tokumitsu ................. 364/900 |

FOREIGN PATENT DOCUMENTS 61-262922  5/1985  Japan.

OTHER PUBLICATIONS

"Microprocessor does multitasking in real time", Electronics; Nov. 3, 1982, pp. 71-72.

Primary Examiner—Lawrence E. Anderson
Attorney, Agent, or Firm—Oblon, Spivak, McClelland, Maier & Neustadt

[57] ABSTRACT

An information processing apparatus is provided in which a processor is connected to a memory via address and data buses and an address bus is connected via a continuous address-specifying signal generating circuit. In a continuous access mode, the continuous address data generating circuit is responsive to an instruction signal for re-setting itself to an initial value and sequentially supplying a continuous address data to the memory's designated address. In the continuous access mode, the address bus is employed, together with the aforementioned data bus, as a data bus in a parallel fashion so that a data transfer capability can be extended.

6 Claims, 7 Drawing Sheets

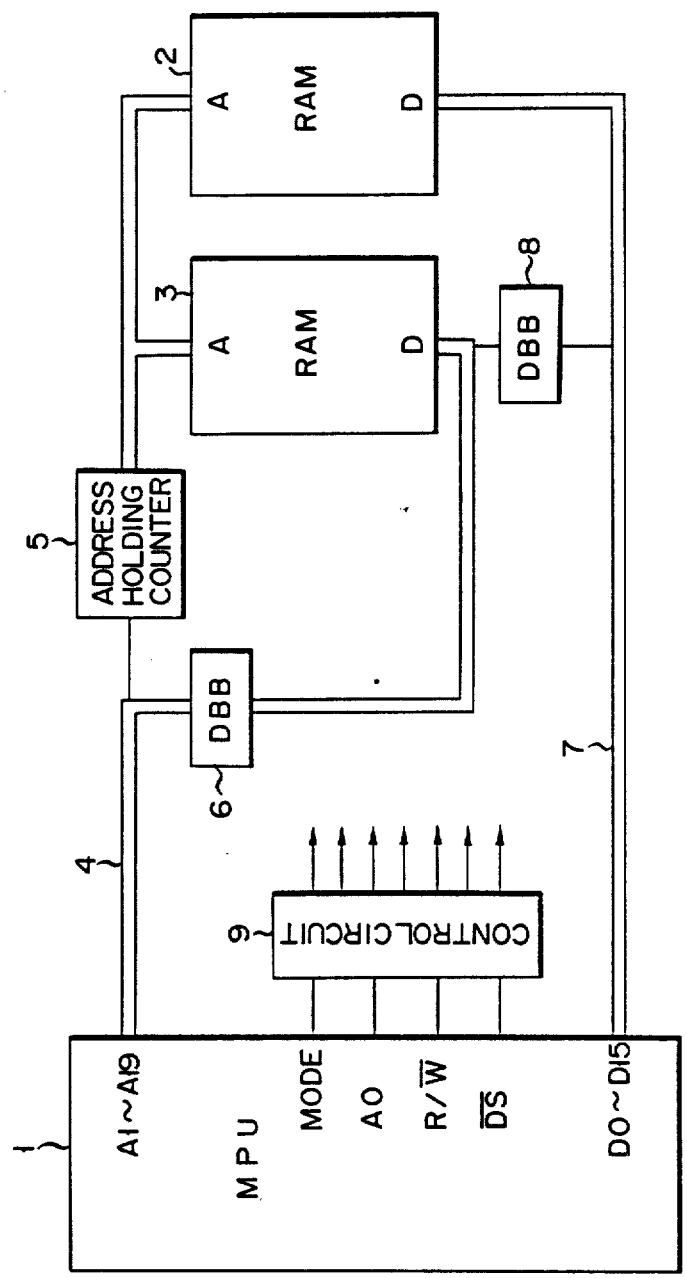
F I G. 3

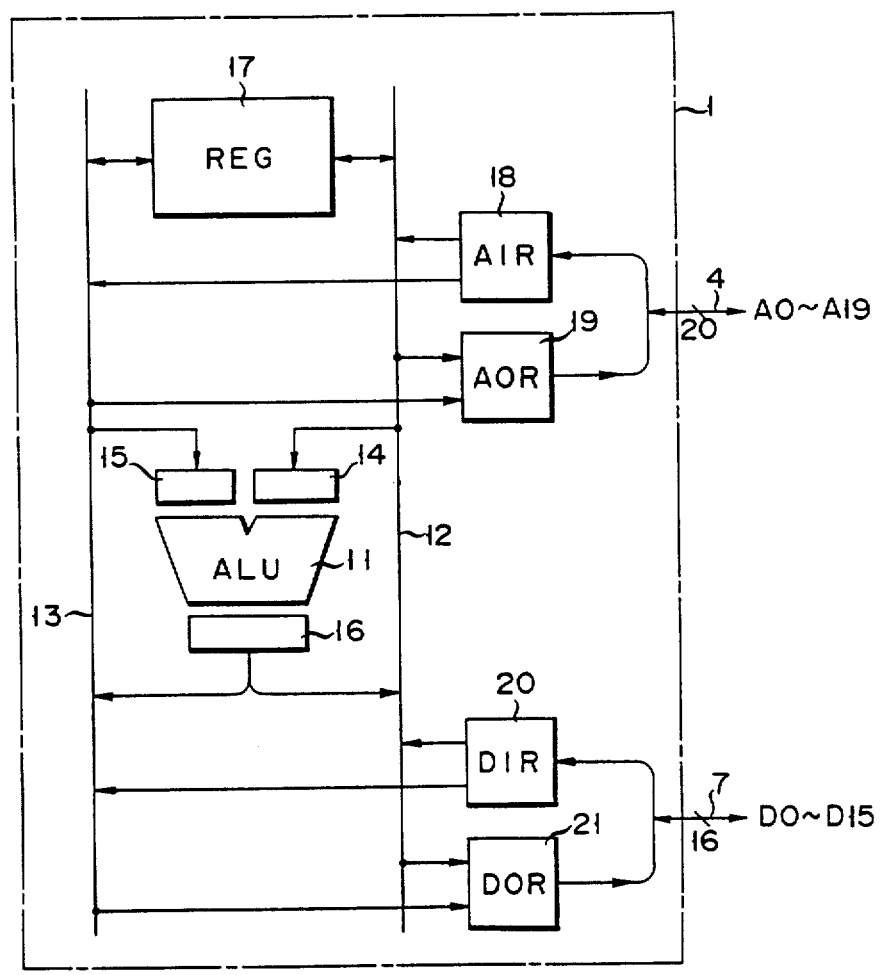
F I G. 4

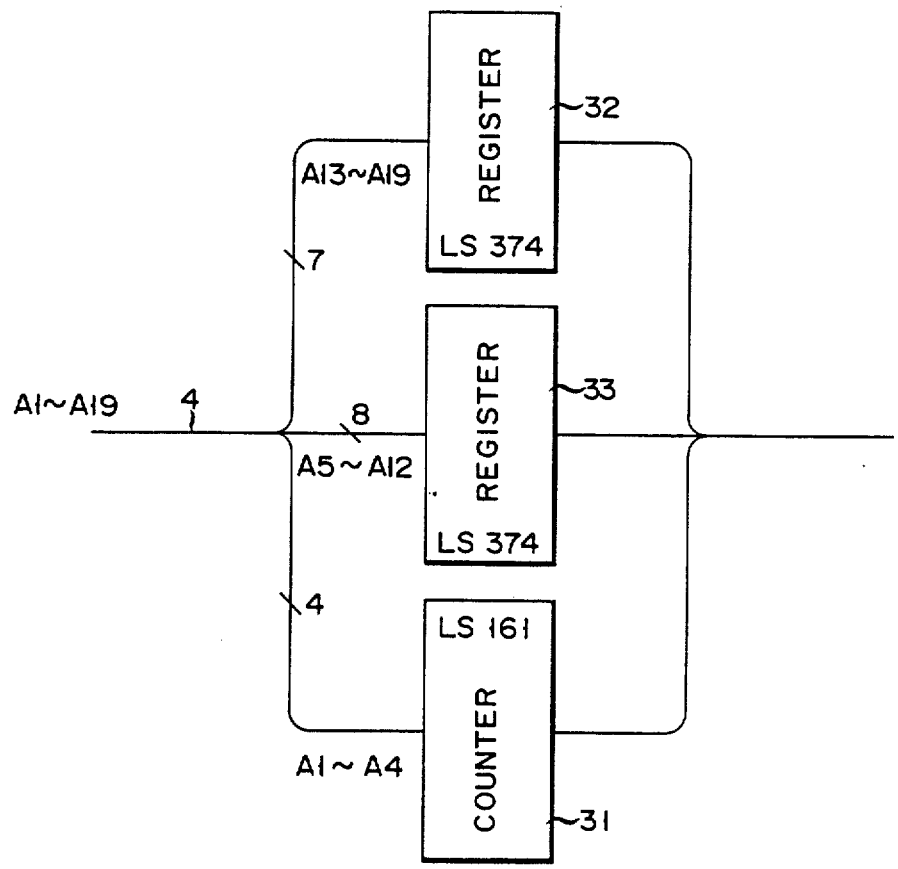
F I G. 7

INFORMATION PROCESSING APPARATUS WHEREIN ADDRESS PATH IS USED FOR CONTINUOUS DATA TRANSFER

This application is a continuation of application Ser. No. 210,994, filed on June 24, 1988, now abandoned.

BACKGROUND OF THE INVENTION

1. Field of the Invention

The present invention relates to an information processing apparatus which delivers an access instruction to an external memory and, in particular, an information processing apparatus having the function of, for example, saving and restoring, at high speed, data elements showing the inner state of a processor's register file and status word upon an interrupt response, upon a subroutine call and upon a return, etc.

2. Description of the Related Art

Generally in the information processing apparatus using a microprocessor, in order that, upon the occurrence of an interrupt, a corresponding interrupt processing may be performed by switching the processor's run state, it is necessary to, upon the occurrence of such an interrupt, temporarily reserve the inner state of the processor's register, as well as the inner states, such as status words, condition code and mode bits. For this reason, the inner state of the register, etc. is continuously saved in an external stack or in a memory at a specifically reserved address. At the completion of such an interrupt, the saved data is continuously read from the corresponding memory address so that the register's inner state is restored.

In the saving and restoring steps made in a continuous access mode, an increase in the number of registers results in a longer time spent for continuous access. Consequently, there is a disadvantage of involving an increase of an interrupt overhead, including an interrupt entering time and returning time due to a slow interrupt response.

In order to enhance a processing efficiency using a high level language, the microprocessor has been equipped with 8 to 16 registers of 16 to 32-bit capacity, involving an increase of an interrupt overhead resulting from the data saving to a register and restoring to an original location.

In order to solve the aforementioned problem, the so-called "register bank switching system" has been adopted in which two or more sets of registers are provided in a microprocessor and, upon the occurrence of an interrupt, an involved register set is switched to another register set. This system is disclosed, for example, in "Electronics" Nov. 3, 1982.

It is, therefore, difficult to prepare against nested interrupt, because a restricted number of register sets are employed. To combat this problem, it is necessary to use a very large number of register sets. Indeed this system includes a greater number of register sets, but only one register set is employed, in practice, at a time during the run of a program, thus lowering the register's availability efficiency.

In the case where, upon the occurrence of an interrupt, the register's and inner states, for example, need to be saved or restored to the original state, it is not possible to disregard an attendant increase in a whole access time in a conventional continuous access system and it is also not possible to flexibly prepare against nested interrupt in the conventional register bank switching system.

SUMMARY OF THE INVENTION

It is accordingly the object of the present invention to provide an information processing apparatus which can efficiently gain access to continuous memory addresses and hence improve a processing speed at the time of continuous access and, at the same time, flexibly prepare against an interrupt processing.

In order to achieve the aforementioned object, an information processing apparatus is provided which comprises: a processor; memory means accessible by address data, the address data comprising upper bits of a plurality of bits as an address from the processor with a least significant bit excluded; an address bus and data bus connected between the processor and the memory means; continuous address data generating means, connected partway of the address bus, for allowing the address data to be supplied, in a normal mode, from the processor to the memory means, for setting itself to an initial state, in a continuous access mode, upon receipt of the address data from the processor and for allowing the address data corresponding to the plurality of bits to be supplied for every up-count to the memory means so that access to the specified address is made; and address bus connection switching means which, in order to allow a portion of the address bus which is connected between the processor and the continuous address data generating means to be employed, together with the data bus, as a data bus in a parallel fashion, switchingly connects the address bus to the input and output terminals of the memory means.

The information processing apparatus of the present invention can gain access to a memory at the time of a continuous access mode by a continuous address from the continuous address generating means and hence enables the address bus which is connected to the processor to be employed, together with the data bus, for data transfer. As a result, it is possible to broaden the bit width of an effective data bus at the time of data transfer and hence to largely improve the data transfer capability.

This information processing apparatus of the present invention can reduce a processing time in a continuous access mode upon the register saving and restoring and can reduce an overhead, such as an interrupt processing time, while maintaining the flexibility upon the interrupt processing as in the conventional continuous access system, so that a high-speed processing can be carried out.

BRIEF DESCRIPTION OF THE DRAWINGS

FIG. 3 is a block diagram for explaining a flow of address data and read-write data at the time of a continuous access mode;

FIG. 4 is a block diagram showing one form of a processor in the block diagram shown in FIG. 1;

FIG. 7 is a block diagram showing one form of an address holding counter shown in FIG. 1.

DETAILED DESCRIPTION OF THE PREFERRED EMBODIMENTS

An information processing apparatus according to an embodiment of the present invention will be explained below with reference to the accompanying drawings.

Figure 1:
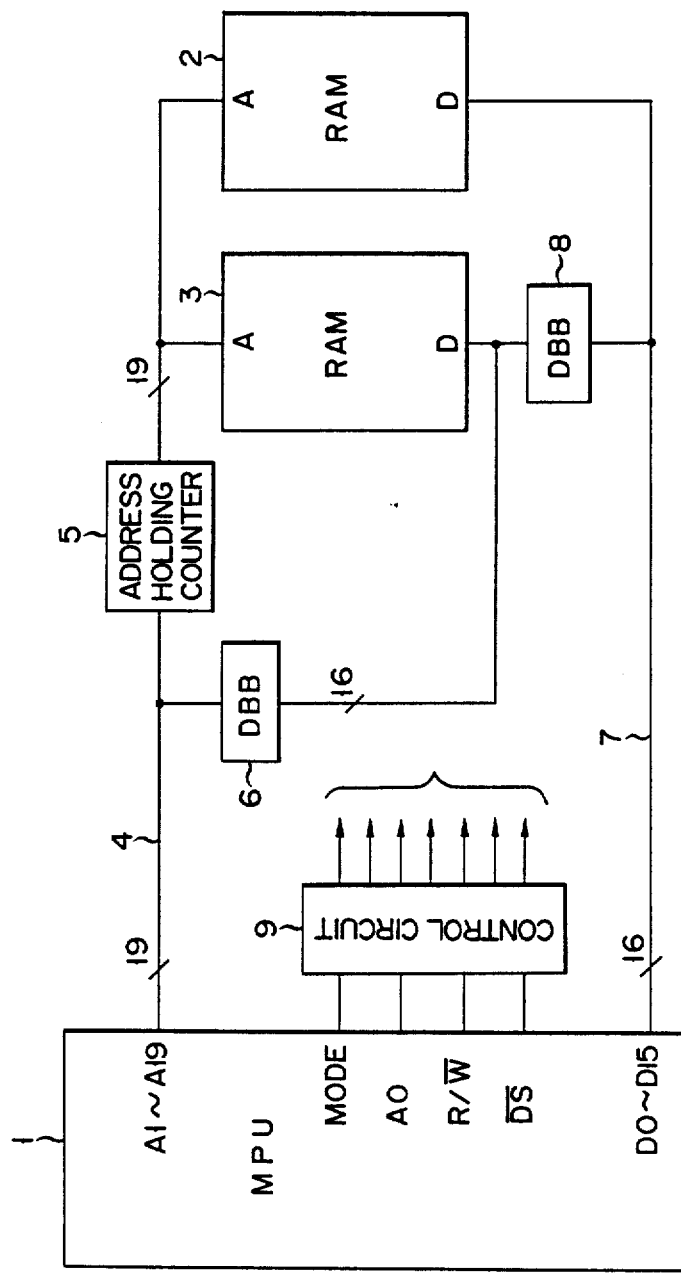
FIG. 1 is a block diagram showing an information processing apparatus of the present invention.

FIG. 1 shows an arrangement of an information processing apparatus according to the embodiment of the present invention. Processor 1 is of such a type that address bus 4 and data bus 7 are connected as external buses to associated devices, respectively. The address bus can send 20-bit address to the corresponding associated circuit and the data bus can send 16-bit data to the corresponding associated circuit. Processor 1 performs the execution of an instruction, read/write operation, etc. RAM 2 for even-numbered addresses and RAM 3 for odd-numbered addresses are provided as a memory in the information processing apparatus. These RAM's in the memory have 20-bit addresses against a word unit (16-bits). Of 20 bits of address bus 4 connected to processor 1, the upper 19 bits of address bus 4 is connected to the address input terminal A of RAM's 2 and 3 via address holding counter 5 (an address generating means) and a data input/output terminal D of RAM 3 via data bus buffer 6. 16-bit data bus 7 connected to processor 1 is connected directly to the data input terminal D of RAM 2 and to the data input terminal D of RAM 3 via second data bus buffer 8.

Processor 1 delivers, to control circuit 9, various control signals, that is, a mode signal MODE for indicating whether an access mode is a normal mode or a continuous mode, a least significant bit A0 of address signal for indicating whether an address to be accessed is even-numbered or odd-numbered, read/write signal R/W for indicating the direction in which data is transferred, and signal DS for indicating a data transfer timing. Control circuit 9 controls the operations of address holding counter 5 and two data bus buffers 6 and 8 on the basis of the respective control signals.

Figure 2:
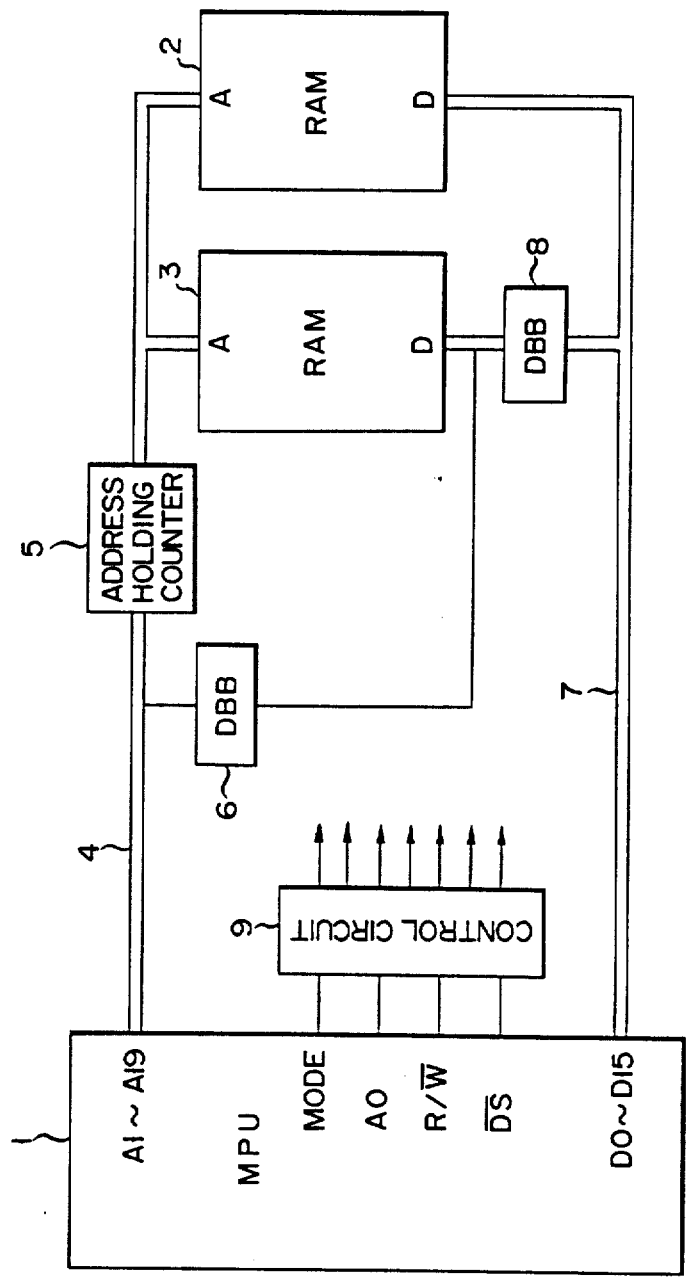
FIG. 2 is a block diagram for explaining a flow of an address-specifying signal and read-write data at the time of a normal mode in the block diagram of FIG. 1.

The operation of the aforementioned circuit in a normal mode will be explained below in conjunction with FIG. 2. The heavy lines in FIG. 2 represent channels for address data and read/write data.

A normal mode is an access mode, as in the conventional method, between processor 1 and RAM's 2 and 3. In this mode, input address-designating signal is allowed to simply pass through address holding counter 5. The address data A1 to A19 which are supplied from processor 1 are allowed to pass through address holding counter 5 and delivered as the address data to RAM's 2 and 3. Address holding counter 5 takes up the address in a continuous address access mode upon receipt of an address strobe signal, which is output from the processor, and may be preferably a general-purpose TTL 74LS161 for instance, noting that the address strobe signal is a signal for representing that a signal for designating the address to be accessed has been output to the address bus. In this mode, data bus buffer 6 maintains a high impedance state without being operated and prevents an entry of the address-designating signal into the data input/output terminal of RAM 3.

In this mode, control circuit 9 selects RAM 2 when the accessing address is even-numbered, that is, when the least significant bit of the address A0 delivered from processor 1 is "0", and selects RAM 3 when the accessing address is odd-numbered, that is, when the least significant bit A0 of the address delivered from processor 1 is "1". A timing signal which is necessary for a data read/write operation is supplied from control circuit 9 to RAM 2 or 3 thus selected. Data bus buffer 8 operates when RAM 3 is selected. At this time, data is transferred in a read access mode from RAM 3 toward data bus 7 and in a write mode from data bus 7 toward RAM 3.

Thus in the normal mode, a signal for designating an accessing address is supplied at all times from processor 1 via address bus 4 to RAM's 2 and 3. When the even-numbered address is accessed, RAM 2 is selected to allow a data read/write operation to be performed, via data bus 7, relative to processor 1. When the odd-numbered address is accessed, RAM 3 is selected to allow a read/write operation to be performed relative to processor 1 via data bus buffer 8 and data bus 7. At the execution of the odd-numbered address, RAM 2 is not selected and there is not data collision on the data bus.

The operation of the aforementioned circuit in a continuous address access mode will be explained below in connection with FIG. 3. The heavy lines in FIG. 3 represent channels for address data and read/write data.

The continuous address access mode is a mode of a continuous access to RAM's 2 and 3 which, when an interruption occurs or releases on processor 1 or when, for example, a subroutine call or a return occurs, allows the inner state of the processor, the contents of a register file and so on to be saved or restored. In this mode, an initial value of the continuous access is set via address bus 4 to address holding counter 5. Simultaneously with the start of the execution of the continuous address access mode, address holding counter 5 is stepped to sequentially generate address data corresponding to 19 bits of 20 continuous bits as set out above. The address data is supplied simultaneously to RAM's 2 and 3. In this mode, RAM's 2 and 3 are simultaneously selected to produce input and output data in a simultaneous fashion.

At this time, data bus buffer 6 is in operating state and data bus buffer 8 maintains a high impedance state without being operated. The data of data bus buffer 6 is transferred in a read access mode from RAM 3 toward address bus 4 and in a write access mode from address bus 4 toward RAM 3. Thus the data transfer between RAM 2 and processor 1 is made via data bus 7 and the data transfer between RAM 3 and processor 1 is made via address bus 4. Since address bus 4 can be used as data bus, the bit width of the data bus is substantially doubled.

During the continuous access mode, at each termination of a two-word parallel access between RAM's 2 and 3, address holding counter 5 is counted up to generate address data signal so that the next access address can be specified. In this embodiment, prior to the continuous access, the initial value of address holding counter 5 is set, requiring 1 or 2 clocks. Thereafter, the respective "two-word" data transfer is performed using address bus 4 and data bus 7 in a parallel fashion. The continuous access can be terminated at a double of the speed achieved by a conventional respective 1-word access.

In the continuous address access mode, only the least significant bit A0 of the address gains simultaneous access to two different address data at RAM's 2 and 3. For this reason, if the start address of the continuous address access mode is even-numbered, there is no problem. If the start address is odd-numbered, it is only necessary that, subsequent to one-word access, continuous two-word access be started.

In the continuous access mode, a parallel data transfer is performed, in units of 2 words, using both address bus 4 and data bus 7. Thus a means is provided in the processor to allow the parallel data transfer to be made, in units of two words, to the processor.

FIG. 4 shows the inner structure of processor 1 by way of example. 16-bit arithmetic and logic unit 11 (ALU) receives data from two 16-bit internal buses 12 and 13 via temporary registers 14 and 15 and performs a predetermined arithmetic operation and delivers a result of the arithmetic operation to internal buses 12 and 13 via temporary register 16. Register file (REG) 17 stores the aforementioned operation result as well as data, etc., entered from the outside of processor 1. Address input register (AIR) 18, address output register (AOR) 19, data input register (DIR) 20 and data output register (DOR) 21 are connected to two internal buses 12 and 13. AIR 18 and AOR 19 temporarily store address or read/write data to allow address input/output timing to be taken between internal buses 12, 13 and address bus 4. DIR 20 and DOR 21 temporarily store read/write data to allow data input/output timing to be taken between internal buses 12, 13 and data bus 7.

In the aforementioned circuit arrangement, address bus 4 can be handled as a bidirectional bus due to the presence of AIR 18. In the two-bus type processor, both an accessing address to the memory and data can simultaneously be prepared via the respective buses and, in a normal mode, address data for gaining access to the memory address and data for writing data into the memory can simultaneously be set to AOR 19 and DOR 21 and simultaneously output. Furthermore, at the time of a continuous address access mode, two-word data can simultaneously be output using quite the same operation as set out above. Data which are input to AIR 18 and DIR 20 via address bus 4 and data bus, respectively, can be simultaneously stored in register 17.

Figure 5:
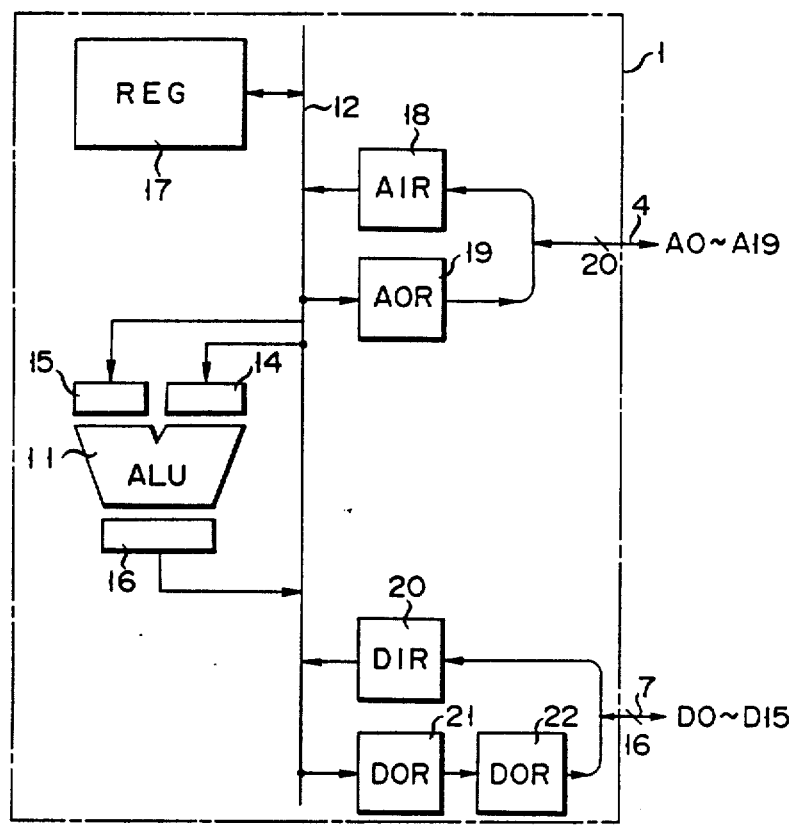
FIG. 5 is a block diagram showing another form of a processor of FIG. 1.
Figure 6:
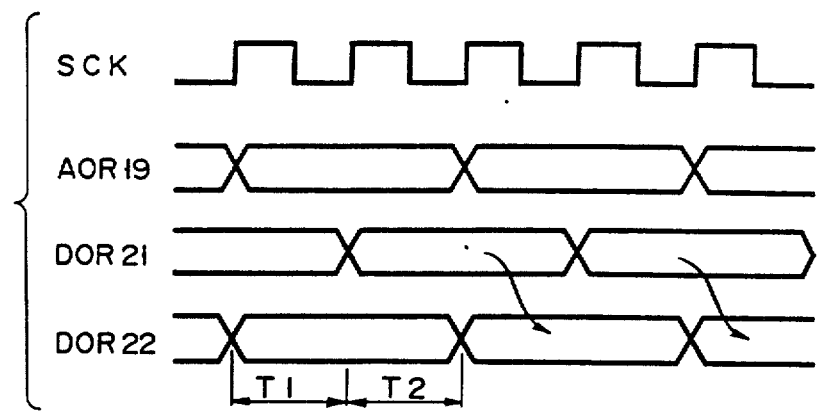
FIG. 6 is a time chart for explaining a data output timing of the processor of FIG. 5.

As shown in FIG. 5, for example, in the case of processor 1 having only one internal bus, the access rate is largely not reduced. That is, the access time to an ordinary memory requires 2 to 4 clocks, while at the same time the transfer of the data within the processor can be achieved in one-clock time. Even if, as shown in FIG. 5, for example, the data output register is constituted by DOR's 21 and 22 and the internal data transfer is performed sequentially in 1-word units, an adequate time can be left to gain access to memory. FIG. 6 shows the output timing of AOR 19 and DOR's 21 and 22. In FIG. 6, data is written into DOR 21 during a T1 time period and into AOR 19 at a T2 time period. From FIG. 6 it is found that the output timing of AOR 19 corresponds to that of DOR 22.

FIG. 7 shows another embodiment of this invention where a simplified version of address holding counter 5 is provided as a continuous address generating means.

Address holding counter 5 requires an up-count function so as to generate address data when RAM's 2 and 3 are accessed. Since the number of words accessed in a continuous fashion is a few words or a few tens of words at most, the effect of the present invention is hardly affected even if restriction is made to the count-up value range.

As shown in FIG. 7, for example, the 19-bit address holding counter (FIG. 1) may be replaced by 4-bit counter 31 and 15-bit simple register unit (32 and 33). Even if any carry occurs from counter 31 (the lower 4 bits) to registers 33 and 32 (upper bits), registers 33 and 32 cannot receive such a carry, making it necessary to re-set the addresses of address holding counter 5, that is, counter 31 plus registers 32 and 33. Since, however, the re-setting of addresses is required at a rate of once per 16 times, it will be needed nearly once at most when a few words to a few tens of words are accessed. Thus the processing delay resulting from the re-setting of the addresses is almost disregarded and the effect of the present invention is almost not influenced. A general-purpose TTL, such as 74LS374, may be employed as registers 32 and 33 which, combined with the 4-bit counter such as 74LS161, can provide a three-package unit at low cost.

Although counter 31 has been explained as receiving those A1 to A4 (corres. to 4 bits) of the address data A1 to A19 and counting them, it is not necessary to restrict the number of receiving signals A1 to A19 to those A1 to A4 only.

In the preceding embodiment, data bus 7 and address bus 4 are 16 and 20 bit widths, respectively, in which case the least significant one A0 of the address is selectively employed relative to RAM's 2 and 3 and 16 bits of the address bus 4 are employed for data transfer with 3 bits left.

Figure 8:
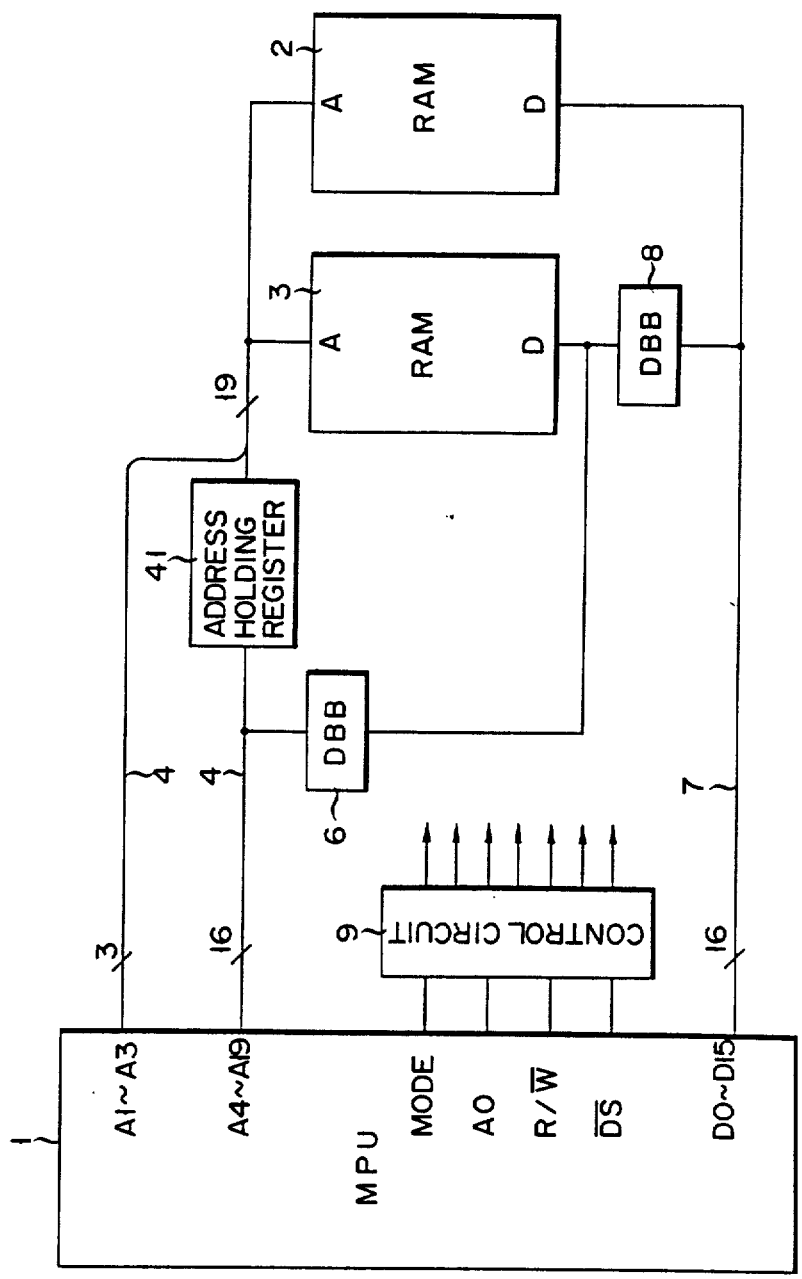
FIG. 8 is a block diagram showing an information processing apparatus of the present invention.

In the embodiment of FIG. 7, only a few lower bits of the address data are generated from counter 31 and, in this case, the three left address bits are directly connected to RAM's 2 and 3 and the counter's section for the count-up timing, somewhat complex function, etc. is replaced by a counter in microprocessor 1 as shown in FIG. 8.

In FIG. 8, the same reference numerals are employed to designate the same parts or elements corresponding to those shown in FIG. 7 and further explanation of them is therefore omitted. In the embodiment shown in FIG. 8, out of the address data shown, three lower bits A1 to A3 are generated from a counter in processor 1 and supplied directly to RAM's 2 and 3 and 16 bits (A4 to A19) are held by address holding register 41 outside processor 1 and supplied as address data to RAM's 2 and 3 via address holding register 41.

In a continuous address access mode, 16 address data A4 to A19 are supplied to RAM's 3 and 2 over address bus 4 in which case the word transfer is performed using address bus 4 and data bus 7 in a parallel fashion as already set out in connection with the preceding embodiment.

Since, according to the present apparatus, the counter is provided, in processor 1, for generating address data for continuous access, the time at which the address should be re-set can be known in advance from the occurrence of a carry from the aforementioned counter section and thus an effective control operation can be carried out.

Although in the aforementioned embodiment the processor has been explained as having a 20-bit address bus, if a processor has a 24-bit width address bus, the lower 7 bits can be supplied from the counter in the processor. In this case, since the probability of generating a carry into the high order bit position from the counter section is prominently reduced, it is almost unnecessary to re-set the addresses. Thus an efficiency can be further improved.

The present invention is not restricted to the aforementioned embodiment. For example, if the address bus has a double the bit number of the data bus, the data may be transferred in units of 3 words in a parallel fashion. In this case, it is necessary to increment the addresses in unit of three and thus to perform a somewhat complex control operation.

Although in the aforementioned embodiment RAM's 2 and 3 are used as a memory, if the present invention is applied to data fetch, such as an instruction fetch, it can also be applied to the case where a ROM is employed as a memory. Furthermore, even if a memory is built within the same chip as a microprocessor, such as a one-chip microprocessor, there are cases where an external memory is desired to be employed for, for example, program debugging and LSI tests. Even in this case, the present invention can effectively be applied. The present invention can also effectively be applied to those cases as, for example, a continuous access upon the start of a system, data saving to a register upon the execution of a jump instruction, and restoring and data saving to a register upon the generation of a choice point and back-tracking in Prolog and restoring to an original location, etc.

What is claimed is:

1. An information processing apparatus comprising:
   a processor;
   memory means accessible by an address, said address comprising a plurality of bits as an address from the processor;
   an address bus and a data bus connected between the processor and the memory means;
   serial address generating means, connected at both ends to said address bus, for allowing the address from the processor to be supplied, in a normal mode, to said memory means, for setting itself to an initial state corresponding to an initial arbitrary address value in a continuous access mode, upon receipt of the initial address from the processor, and for allowing said address corresponding to said plurality of bits to be supplied as one unitary address to said memory means each time said serial address generating means counts up upon receipt of a signal from said processor so that access to the next address is made; and
   address bus connection switching means for switching an address path formed between said processor and an address input terminal of said memory means to a data path formed between said processor and a data input terminal of said memory means in such a manner that data is inputted to the data input terminal of said memory means through the address path and said data bus in said continuous mode, whereby the bit width for data transfer is broadened by using said address path and data bus in parallel fashion.

2. The information processing apparatus according to claim 1, wherein
   said memory means comprises a first memory section having odd-number specifying addresses and a second memory section having even-number designating addresses;
   said processor generates a signal of the lowest bit of the bits constituting said address which signal selects either one of said first and second memory sections in said normal mode for access to be had to said one memory section; and
   said continuous address generating means permits a signal of the upper bits other than said lowest bit of the bits constituting said address to be supplied to said first and second memory sections.

3. The information processing apparatus according to claim 1, wherein
   said continuous address generating means comprises count means for counting predetermined bits of those bits in said address from said processor and register means for holding the remaining bits; and
   said processor which, when a carry is generated by an operation of said count means in said continuous access mode, interrupts continuous access to said memory means and restarts address designation of said address data, to be supplied to said memory means.

4. The information processing apparatus according to claim 1, wherein said continuous address generating means comprises:
   count means provided in said processor and connected to said memory means via said address bus for delivering a count output as an address to said memory means; and address holding register means connected between said processor and said memory means via an address bus different from said address bus.

5. The information processing apparatus according to claim 1 or 3, wherein said address bus has a bit width set greater than that of said data bus and, out of a bit width of said address bus, those bits corresponding to the bit width of said data bus are employed for data input and output and the remaining bit width is used for designating a corresponding address.

6. The information processing apparatus according to claim 1, wherein said memory means comprises first and second RAM's and a least significant bit of said address is used to select either one of first and second RAM's.

* * * * *